RECORD CHANGER SPINDLE

Filed Jan. 21, 1948

2 SHEETS—SHEET 1

Inventor:
Arthur L. Knox
By: Clarence J. Loftus
Attorney

Dec. 16, 1952 A. L. KNOX 2,621,932

RECORD CHANGER SPINDLE

Filed Jan. 21, 1948 2 SHEETS—SHEET 2

Inventor:
Arthur L. Knox.
By: Clarence J. Loftus
Attorney

Patented Dec. 16, 1952

2,621,932

UNITED STATES PATENT OFFICE 2,621,932

RECORD CHANGER SPINDLE

Arthur L. Knox, Fort Wayne, Ind., assignor to The Magnavox Company, Fort Wayne, Ind., a corporation of Indiana Application January 21, 1948, Serial No. 3,410

4 Claims. (Cl. 274—10)

The present invention relates to phonograph record changers and more particularly to a changer of the offset spindle type.

In the construction of record changers for automatic phonographs, the offset spindle type of changer has certain marked advantages, since it plays intermixed ten and twelve inch records without adjustment; yet the fullest utilization of the inherent advantages of this type of changer has not heretofore been realized because of certain mechanical problems that have hitherto defied full solution.

Conventional spindle changers include a vertical spindle in which the upper end is slightly offset from the lower end to provide a small ledge or shelf upon which the stack of records is supported. In the usual arrangement, the records are changed by shifting the bottom record of the stack laterally, so that it is pushed off of the shelf and is free to slide down the spindle to the turntable. In most prior constructions, however, the remaining records of the stack have been permitted to drop to the supporting shelf, but has been found that the weight of a stack of records is sufficient so that even this short drop is apt to cause a considerable degree of chipping and wear on the records. Some devices are known to have been designed with the intention of providing a means for more gently lowering the records, but so far as known to the applicant these have included such delicate mechanical complexities that they have not been satisfactory in actual use. In this connection it may be pointed out that since the hole in a standard phonograph record is scarcely more than a quarter of an inch in diameter, the internal mechanism of the spindle must necessarily be very small. It follows that the internal parts are quite skillfully designed; they may be so fragile and delicate as to be subject to mechanical failure and consequently entirely unsatisfactory from a practical standpoint. The problem is further complicated by the fact that mechanisms of this character are ordinarily placed in the hands of persons unskilled in mechanics and without neither the knowledge nor the inclination to give the devices proper lubrication or service. Thus over a period of years a certain amount of wear must be expected, and in order to be satisfactory the parts must be so designed that they will not wear excessively, but will maintain their adjustment and operate properly even after long use.

With the prior mechanisms known to this applicant, the parts have been so designed as to require considerable power to cause them to function. The application of this force to the delicate parts of the mechanism invites excessive wear, and the wear in turn so alters the adjustment of the mechanism that the power requirements may be even further increased, until jamming of the mechanism takes place.

It is accordingly the primary object of the present invention to provide an improved and simplified record changer spindle having mechanism for shifting the lowermost record laterally to deposit it on the turntable, yet characterized by means to cushion the descent of the remaining records in the stack to bring them to rest on the spindle shelf without perceptible impact.

A further object of the invention is to provide a record changer spindle of the general type indicated but of unusually simple mechanical design, so that it will function positively with a minimum application of power, and will be sufficiently strong and rugged to withstand long use without requiring attention or service.

A still further object of the invention is to provide a record changer spindle having substantially fewer parts than heretofore employed to accomplish the necessary functions, and designed to avoid the necessity of extremely accurate adjustment of the parts with respect to each other; so that the spindle will not only function when in perfect adjustment but will not be greatly affected by the small misadjustments resulting from wear of the parts after long service.

Other objects of the invention will become apparent from the following description and the drawings attached to and forming a part of this specification, in which.

Figures 1, 2, 3:
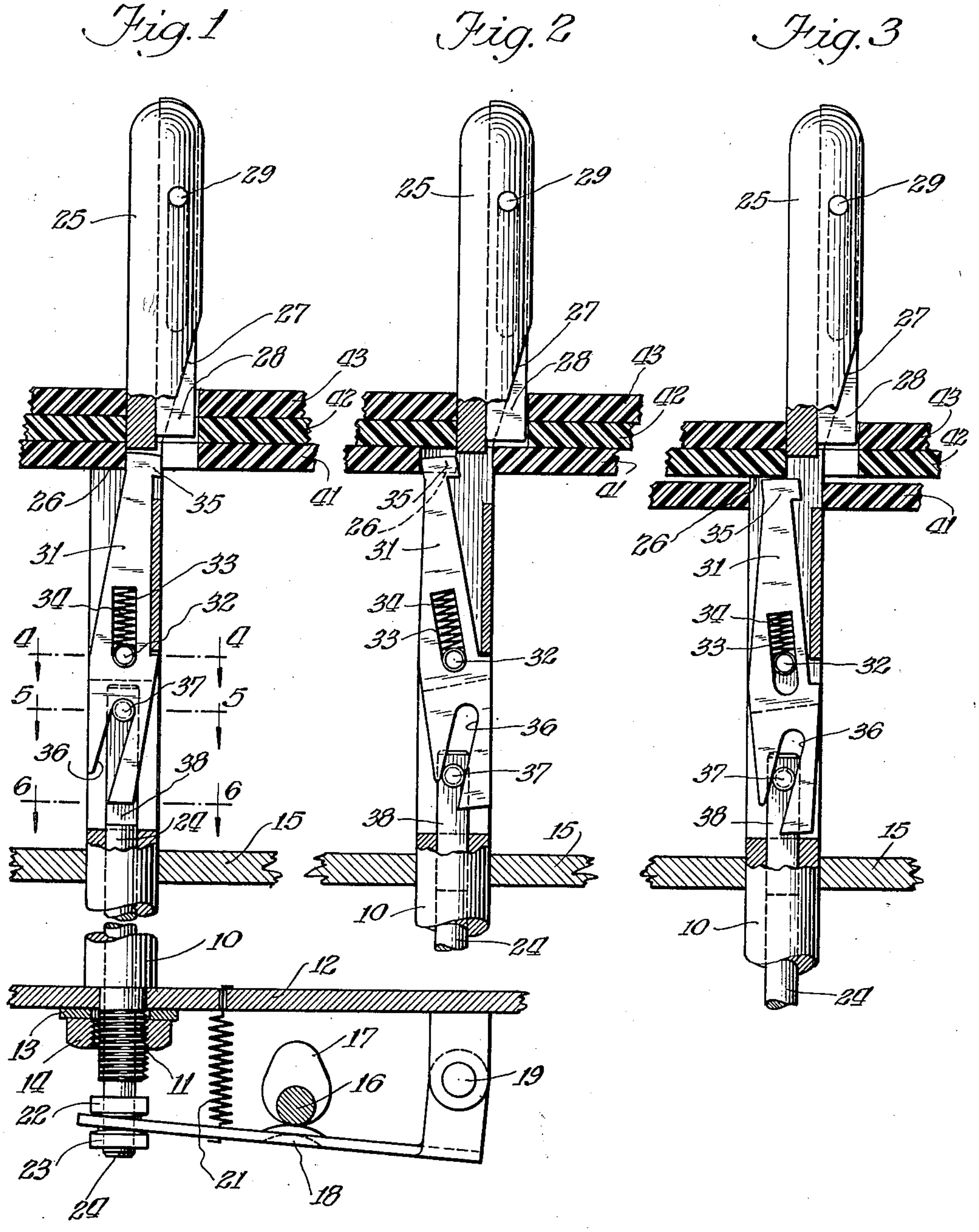
Figure 1 is a central sectional view, partly in elevation, showing a record changer spindle constructed in accordance with the teachings of this invention.
Figure 2 is a fragmental view similar to Figure 1 in a changed position.
Figure 3 is a fragmental view similar to Figure 1 in a second changed position.
Figure 4:
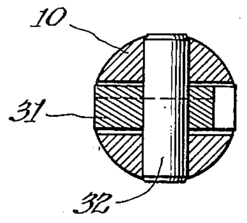
Figure 4 is a detail sectional view taken substantially on the plane of the line 4—4 of Figure 1.
Figure 5:
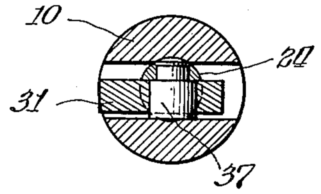
Figure 5 is a detail sectional view taken substantially on the plane of the line 5—5 of Figure 1.
Figure 6:
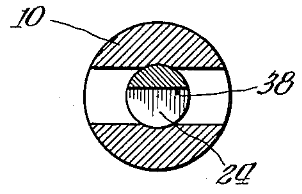
Figure 6 is a detail sectional view taken substantially on the plane of the line 6—6 of Figure 1.
Figure 7:
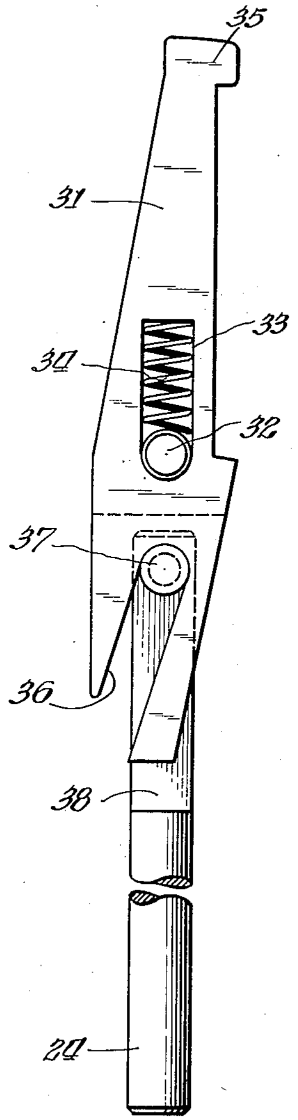
Figure 7 is an enlarged view of the principal operating parts of the spindle.
Figure 8:
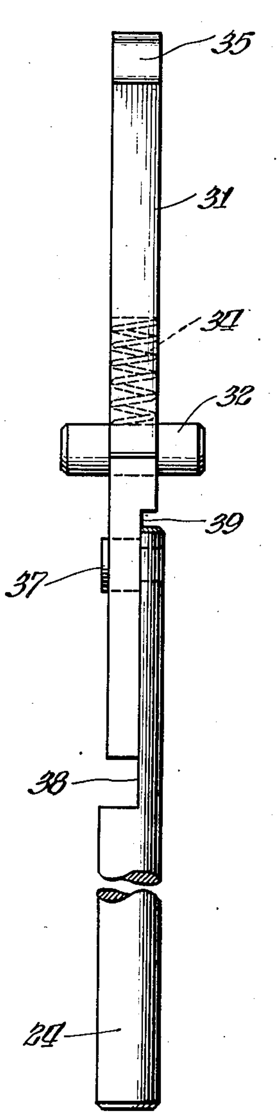
Figure 8 is a side elevational view of the parts shown in Figure 7.

The record changer spindle 10 may be mounted in any convenient manner, such as by passing a threaded lower end portion 11 through a supporting plate 12 and securing it in position by a lock washer 13 and nut 14. It will be understood, of course, that the spindle 10 is positioned in the center of a phonograph turntable 15, and that the operating mechanism is provided to rotate the turntable. The spindle actuating mechanism is shown as a rotary shaft 16 having a cam 17 working against the lever 18 mounted on a pivot 19 and urged upwardly by a coil spring 21, so that rotation of the cam 17 raises and lowers the end of the lever 18, and bears against the collars 22 and 23 to reciprocate an actuating rod 24 extending upwardly through the spindle. The spindle 10 extends substantially above the turntable 15 and has its upper end 25 offset to provide a record supporting shelf 26. The offset portion 25 of the spindle is preferably tapered at 27 to facilitate removal of the records after playing, and is preferably slotted in the conventional manner to receive a sliding key 28 held in position by the pin 29.

The spindle is slotted immediately below the record support shelf 26, so that a lever 31 may be mounted for pivotal movement on a cross pin 32. This pin is fixed in the spindle 10, and the lever 31 is provided with a longitudinal slot 33 through which the pin 32 passes. A small coiled compression spring 34 is placed in the slot above the pin, so that the lever is normally maintained in its uppermost position, with its upper end or head 35 somewhat above the record supporting shelf 26 (Figure 1). The lower end of the lever 31 includes an angular slot 36 which acts as an operating cam to shift the lever between the positions shown in Figure 1 and Figure 2. The lever 31 is moved by a small stud pin 37 at the upper end of a flattened portion 38 of the vertical operating rod 24 extending upwardly through the center of the spindle. One of the surfaces of the lever is cut away at 39 to clear the flattened portion 38 of the rod 24, so that the stud 37 riveted to the extreme upper end of the rod may ride in the slot, and act to rock the lever 31 in a counterclockwise direction in response to downward movement on the rod (Figure 2). Upward movement of the rod 24 rocks the lever 31 in a clockwise direction.

In the operation of the mechanism, the records 41, 42 and 43 are placed in position on the upper portion 25 of the spindle. The records will slide down the spindle until the lowermost record rests on the spindle shelf 26. In this position the head portion 35 of the lever 31 lies inside of the opening of the lowermost record 41, but does not extend far enough upwardly to engage the second record 42. To automatically lower the bottom record 41 to the turntable 15 the actuating mechanism is energized, rotating the camshaft 16 through one revolution of movement. The operation of the cam 17 and lever 18 draws the actuating rod 24 downwardly, and then allows the spring 21 to return to its original position. The downward movement of the operating rod 24 moves the stud 37 along the inclined slot 36 in the lever 31, so that the lever is pivoted in a counter-clockwise direction around the pin 32. This moves the head 35 of the lever to the left, and since the head of the lever lies within the opening in the bottom record 41, its movement shifts the record laterally off of the shelf 26 so that it is free to slide down the spindle to the turntable. The key 28 in the upper portion of the spindle 25 prevents the records 42 and 43 from shifting with the lower record 41, but since these records are no longer supported by record 41 they will move downwardly by gravity until the record 42 comes to rest on the shelf 26.

It has been pointed out that if a large number of records are positioned in the stack on the spindle their weight is very substantial and the impact of this mass falling on the small surface of the supporting shelf 26 can result in chipping and wear on the records unless provision is made to cushion this shock and lower the records into position gently and without perceptible impact. This is done in the present invention by the lever 31. It will be apparent that as the head 35 of the lever shifts the lowermost record off of the shelf 26, it also moves into a position immediately below the surface of the second record 42. Thus as the stack of records moves down, the record 42 engages the top of the lever 31 before it comes into contact with the shelf 26. The weight of the stack of records is sufficient to compress the spring 34 and force the lever 31 downwardly, but the action of the spring cushions the descent of the records on to the shelf sufficiently to prevent any substantial impact and thus avoid the possibility of chipping or damage to the record surfaces. It may also be noted that the downward movement of the lever 31 moves the slot 36 slightly downwardly over the stud 37 and thus releases the engagement between the head 35 of the lever and the inner surfaces of the lowermost record, so that it is entirely free to slide down the spindle (Figure 3).

From the foregoing, it will be apparent that the teachings of this invention provide a novel and improved record changer spindle having important features not heretofore contemplated in the art. It is first pointed ou that the mechanism is extremely simple and has a minimum number of operating parts. The operating parts are relatively large and rugged and are so designed as to function without any unnecessarily critical adjustments that could be materially altered by wear after long service. The power requirements for this mechanism are much less than in devices of this general character heretofore devised, since the records are at all times supported solely on the spindle or on the operating lever carried by the spindle, and do not at any time rest on the operating rod 24. The rod acts as a tension element, to exert a pull rather than a push, and is thus free from any damaging tendency to buckle or bind in the spindle. This is a departure from the teachings of some prior devices which not only required the tiny central operating rod of the spindle to act as a push rod, but also to support the weight of the records. In fact, some devices have even required this rod and its cam mechanism to lift the entire weight of the stack at a certain point of the operation. Avoiding the difficulties incident to supporting the records by a push rod of course eliminates a serious problem of service, since the reduction of the large power requirements results in the elimination of unnecessary wear and thus avoids one of the most frequent causes of mechanical failure.

The form of the invention shown in the drawings and described herein is the present preferred commercial embodiment of the invention and is believed well suited to a description of the principles of operation and the advantages to be attained by the use of this device. It should be remembered, however, that various modifications and variations of the exact structure shown may be indulged in without sacrifice of all of the advantages of this teaching, and it is accordingly pointed out that the scope of this inventive concept is not limited to the precise form of the invention illustrated but extends to any variation or modification thereof coming within the terms of the appended claims.

Having thus described the invention, what I claim as new and desire to protect by United States Letters Patent is:

1. In a record changer having a vertical offset spindle, a record shelf between the upper and lower portions of the spindle and a slot in the spindle below the shelf; the combination of a lever carried within the slot of the spindle with a head portion normally extending above the record shelf and into the offset portion of the spindle; a generally vertical slot in the lever and a cross-pin fixed in the lower portion of the spindle and extending through the slot in the lever; a coiled compression spring positioned in the slot of the lever and above the cross-pin to maintain the lever in its uppermost position on the pin; a pull rod extending downwardly through the spindle; an inclined cam slot in the lever, a stud carried at the upper end of the pull rod and extending into said cam slot and means for drawing said pull rod and therewith said stud downwardly of the cam slot in the lever to rock the lever about the pin and move the head of the lever laterally to release the lowermost record of the stack and to receive the second record in resilient engagement on the top of the lever.

2. In a record-changer having a vertical offset spindle, a record shelf between the upper and lower portions of the spindle and a slot in the spindle below the shelf; the combination of a lever in said slot comprising a head portion having a record shifting surface normally extending above the record shelf and into the offset portion of the spindle; means for supporting said lever in said slot in pivotal relation and vertically slidable relation with said spindle; a resilient cushion member vertically disposed between said lever and said spindle for normally holding said head portion above said record shelf to yieldingly receive the stack of records when the lowermost record drops; an inclined cam surface on said lever; a tension member extending downwardly through the spindle, and a cam on the upper end of the tension member co-acting with the cam surface on the lever; and means for drawing the tension member downwardly to rock the lever about its pivot and move the head of the lever laterally to release the lowermost record of the stack and to receive the second record in engagement on the top of the lever.

3. In a record-changer having a vertical offset spindle, a record shelf between the upper and lower portions of the spindle and a slot in the spindle below the shelf; a combination of a lever mounted within said slot comprising a head portion having a record shifting surface normally extending above the record shelf and into the offset portion of the spindle; means including a cross pin in the lower portion of spindle operatively associated with said lever for pivotally and vertically slidably connecting said lever with said spindle; a coiled compression spring operatively associated with said lever and said pin for urging said lever upwardly with respect to said spindle to maintain the lever in its uppermost position relative to said pin, an actuating member extending downwardly through said spindle, and cooperating cam surfaces on said lever and said actuating member responsive to downward movement of said actuating member to rock said lever about its pivot, thereby to move the head of said lever laterally to release the lowermost record of the stack and yieldingly to receive the second record on the top of said lever.

4. In a record-changer having a vertical offset spindle, a record shelf between the upper and lower portions of the spindle and a slot in the spindle below the shelf; a combination of a pivot pin mounted on the spindle; a lever mounted in pivotal relation on said pin within said slot, said lever including means for slidably supporting said lever relative to said pin, a head portion on the lever having a record shifting surface normally extending above the record shelf and into the offset portion of the spindle; spring means mounted between said lever and said pivot pin for biassing said lever upwardly with respect to said spindle for maintaining the lever in its uppermost position on said pin, together with an actuating member extending downwardly through said spindle and means operatively associated with said actuating member and said lever and responsive to longitudinal movement of said actuating member to rock the lever about the pin and move the head of the lever laterally to release the lowermost record of the stack and yieldingly to receive the second record on the top of the lever.

ARTHUR L. KNOX.

REFERENCES CITED

The following references are of record in the file of this patent:

UNITED STATES PATENTS

| Number | Name | Date |
| --- | --- | --- |
| 2,293,703 | Becwar | Aug. 25, 1942 |
| 2,523,045 | Miller et al. | Sept. 19, 1950 |

FOREIGN PATENTS

| Number | Country | Date |
| --- | --- | --- |
| 822,026 | France | Dec. 18, 1937 |